Feb. 26, 1957  B. E. RICHET  2,782,668
PROFILING ATTACHMENT AND/OR SYSTEM FOR A MACHINE TOOL
Filed April 7, 1952  2 Sheets-Sheet 1
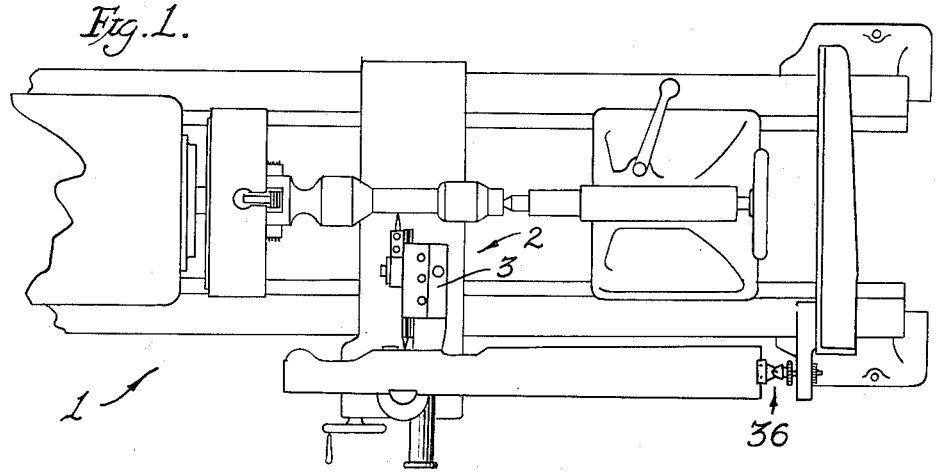
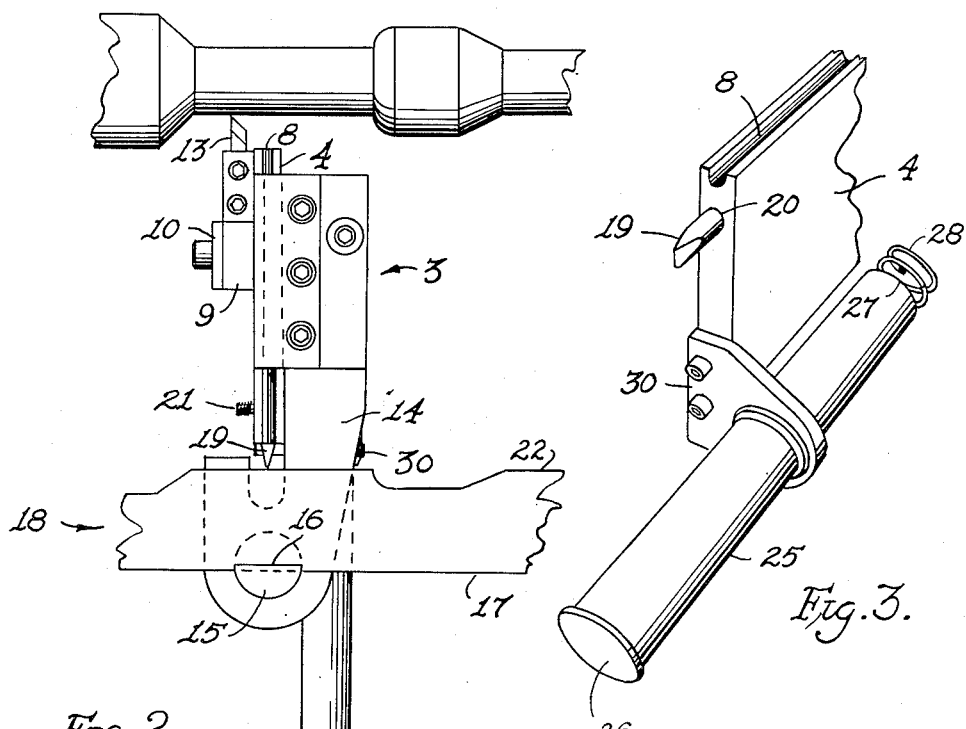
INVENTOR.
BERNARD E. RICHET
BY R. W. Hodgson
AGENT

United States Patent Office 2,782,668
Patented Feb. 26, 1957

2,782,668

PROFILING ATTACHMENT AND/OR SYSTEM FOR A MACHINE TOOL

Bernard E. Richet, North Hollywood, Calif.

Application April 7, 1952, Serial No. 280,915

1 Claim. (Cl. 82—14)

Generally speaking, the present invention relates to a profiling attachment and/or system for use with any of a great number of types of standard machine tools, and which makes it possible for a cutting tool bit to be positionally controlled in exact accordance with a template having a predetermined variable width profile.

I am aware of the fact that several prior art attempts to develop an automatic profiling machine tool and/or attachment for a machine tool, have been made heretofore. However, all of these prior art systems known to me have various major disadvantages of one type or another.

The prior art mechanical systems have been too complicated, costly and critical as to adjustment, and certain systems employing electronic and digital techniques working from coded information-supplying means indicating the desired profile, are extremely costly and difficult to maintain in operative condition.

Furthermore, they require the services of a highly skilled electronics and/or digital techniques engineer to maintain and/or, in certain cases, to operate them.

Generally speaking, the present invention includes a base member adapted to be mounted upon movable tool post base means of a machine tool. Also included is a tool bit carrying slide member slidably mounted with respect to the base member. Also included is fastening means (usually adjustable and/or movable) cooperable with the tool bit carrying slide member for fastening (usually adjustably, removably fastening) a cutting tool bit in a selected, projecting, operative position. Also included is a template engaging member carried by the base member and adapted to movably engage a reference edge (usually the rear edge) of a variable width template. Follower means is carried by the tool bit carrying slide member for movable engagement with respect to the guiding edge (usually the front edge) of the variable width template whereby movement of the template engaging member and the follower means along the reference edge and the guiding edge, respectively, of the variable width template will cause slidable movement of the tool bit carrying slide member and the cutting tool bit carried thereby in a manner corresponding to the variable width of the template positioned between the template engaging member and the follower means.

In the preferred general form of the present invention, biasing means is also included and is adapted for use in biasing the follower means into forced engagement with respect to the guiding edge of the variable width template and for use in biasing the template engaging member into forced engagement with respect to the reference edge of the variable width template.

From the above general description of the basic form of the present invention, it will be apparent to those skilled in the art that virtually all of the hereinabove mentioned art disadvantages are virtually entirely eliminated and overcome in and through the use of the present invention.

With the above points in mind, it is an object of the present invention to provide a novel profiling attachment for a machine tool including a base member and a slidable tool bit carrying member effectively, relatively positionally controlled by a variable width template.

It is a further object of the present invention to provide an attachment of the characters set forth in the preceding object, which positively includes the variable width template as a part of the system.

It is a further object of the present invention to provide a device of the character set forth in either or both of the preceding objects, including biasing means for effectively biasing a follower means, carried by the slidable member, into engagement with a guiding edge of the template and for effectively biasing a template engaging member, carried by the base member, into engagement with a reference edge of the template.

Other and allied objects will become apparent to those skilled in the art after a careful perusal, examination and study of the accompanying illustrations, the present specification and the appended claim.

To facilitate understanding, reference will be made to the hereinbelow described drawings, in which:

Fig. 1 is a diagrammatic, schematic, fragmentary, top plan view of one embodiment of the present invention in mounted, operative position with respect to a lathe.

Fig. 2 is a relatively enlarged, fragmentary, top plan view, similar in aspect to Fig. 1. In this view, both the work and the template are shown broken away.

Fig. 3 is a fragmentary, relatively enlarged, perspective view of the rear portion of the slidable member and the hollow tubular member carrying the biasing spring means.

Figure 6:
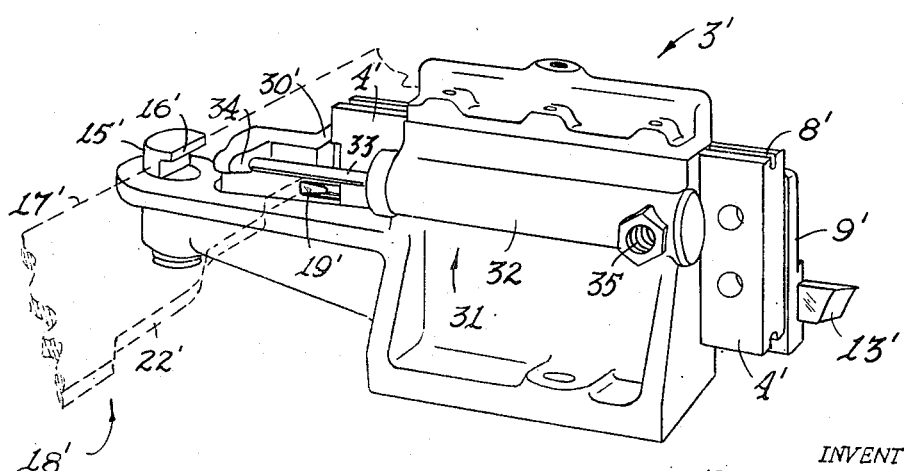

Fig. 6 is a perspective view illustrating a slightly modified form of the present invention wherein the biasing means comprises pressure responsive fluid motor means. The machine tool which is adapted to mount the device is not shown for reasons of clarity. The variable width template is shown, in dotted lines, in fragmentary form.

Generally speaking, the present invention includes a base member adapted to be mounted upon movable tool post base means of a machine tool, and provided with a tool bit carrying slide member slidably mounted with respect to the base member.

In the specific example illustrated in Figs. 1 through 5, a machine tool is indicated generally at 1, and comprises a lathe, which includes a tool post base means, indicated generally at 2, carrying (usually by threaded fastening means such as bolts) a base member 3, which is laterally recessed and slidably carries a slidable member 4 therein between the upper portion 3U and the lower portion 3L of the base member.

Figure 4:
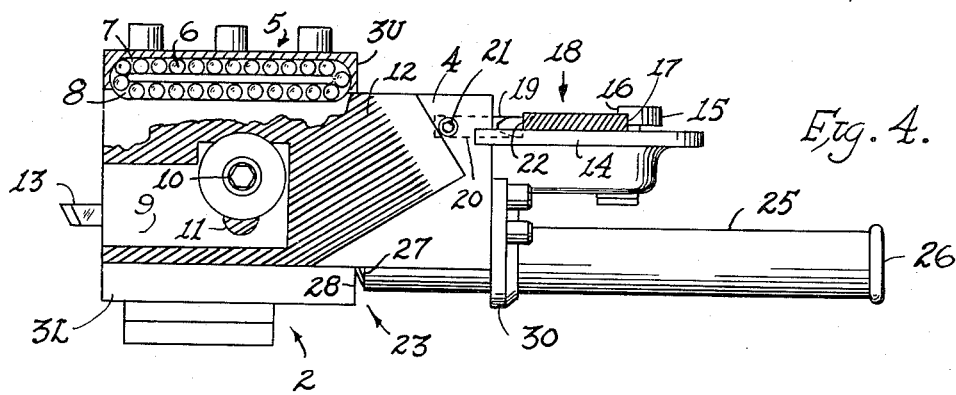
Fig. 4 is a relatively enlarged, fragmentary view, partly in elevation and partly in vertical section, illustrating the device. This view does not show the machine tool which is adapted to carry the device.

In the specific example illustrated, anti-friction means, indicated generally at 5 in Fig. 4, is provided and is effectively positioned between the slidable member 4 and the base member 3 so as to facilitate relative movement therebetween. In the specific example illustrated, the anti-friction means 5 comprises a plurality of pre-loaded ball bearings 6 positioned in the enclosure 7 for circulating movement therethrough and along the groove 8 in the top of the slidable member 4. It will be understood that a similar anti-friction means may be positioned between the lower portion 3L of the base member and the bottom of the slidable member 4 in a generally similar manner. Or if desired, this may be eliminated in certain cases. This is not shown because the upper anti-friction devices fully illustrate the principles involved.

It will be understood that the pre-loaded ball bearing 6 travelling in race-ways effectively eliminate all play and/or back lash.

The tool bit carrying slide member is also provided with fastening means cooperable therewith for fastening a cutting tool bit in a selected, projecting, operative position.

In the specific example illustrated, this takes the form of a member 9 and selectively engageable locking means 10 cooperable therewith. The member 9 is provided with a slot 11 whereby it can be vertically positionally adjusted, and then can be locked in the adjusted position for retaining the cutting tool bit 13 in a selected position, as illustrated. The face surface of the slidable member 4 (and/or the engaging face surface of the member 9) can be provided with grooves, such as are indicated at 12, for the purpose of facilitating the adjustable locking engagement of the member 9 in a selected position with respect to the slidable member 4 so as to hold the cutting tool bit 13 in a selected position.

Generally speaking, the present invention also includes a template engaging member carried by the base member and adapted to movably engage a reference edge of a variable width template.

In the specific example illustrated, this template engaging member comprises an extension arm portion 14, which is rearwardly directed and provided with an upwardly directed portion 15 having a straight over-hanging engaging edge 16 adapted to slidably movably engage the rear reference edge 17 of a template, indicated generally at 18, which is pivotally mounted with respect to the lathe 1 adjacent one end, as indicated at 36. It will be noted that, in the specific example illustrated, the rearwardly extending arm portion 14 effectively supports the template 18.

Also, generally speaking, follower means is carried by the tool bit carrying slide member for movable engagement with respect to the guiding edge of a variable width template.

In the specific example illustrated, this follower means is indicated at 19 and is adjustably mounted in a rearwardly projecting direction in a hole 20 in the rear of the slide member 4 and is positionally adjustable by means of adjusting screw means 21.

It will be noted that the rear end of the follower 19 is in slidably movable engagement with respect to the irregular front guiding edge 22 of the template 18 and is positioned directly opposite the center of the engaging portion 16 of the template engaging means 15 carried by the base member 3 whereby they will be positioned apart on opposite edges 22 and 17, respectively, of the template 18 a distance equal to the variable width of said template 18.

Also generally speaking, biasing means is included and is arranged for use in effectively biasing the follower means into forced engagement with respect to the guiding edge of the variable width template and for use in biasing the template engaging means into forced engagement with respect to the reference edge of the variable width template.

Figure 5:
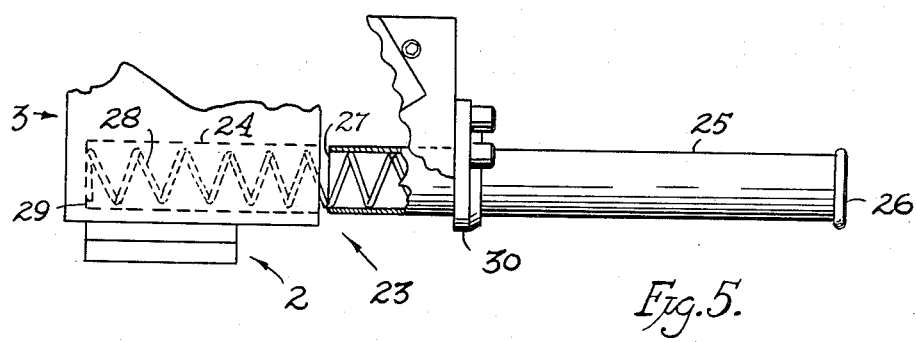
Fig. 5 is a relatively enlarged, fragmentary view, similar in aspect to Fig. 4, but with the top portion broken away, and illustrates the positioning of the biasing spring means, the hollow tube means and the hollow bore means.

In the specific example illustrated, the biasing means is indicated generally at 23 (as best seen in Fig. 5) and comprises rearwardly directed hollow bore means 24 in the base member 3, hollow tube means 25 having a closed end 26 and an open end 27, adapted to extend into and slidably cooperate with the hollow bore means 24, and compression biasing spring means 28 positioned in the hollow interior of the tube 25 abutting the end 26 thereof and extending into the hollow bore means 24 abutting the end 29 thereof. The hollow tube 25 is fastened by suitable bracket means 30 to the rear end of the slidable member 4. The arrangement is such that the biasing spring 28 effectively biases the slidable member 4 and the follower 19 rearwardly so as to cause forced engagement of the rear end of the follower 19 and the front guiding edge 22 of the template 18 while causing engagement of the template engaging member 16 with the rear reference edge 17 of the template 18. In other words, the relative position of the slidable member 4 and the base member 3 will, at all times, be determined by the distance across the template 18 between the tip of the follower means 19 and the engaging edge 16 of the template engaging means 15 carried by the base member 3.

From the above description, the operation of the device is obvious and, therefore, will not be further described.

Fig. 6 illustrates a slightly modified form of the invention wherein the spring biasing means, best shown in Fig. 5, of the first form of the present invention, is replaced by pressure responsive fluid motor means. Similar portions of the invention will be indicated by similar reference numerals, primed however. New structural components will be indicated by new reference numerals.

In this version of the invention, the pressure responsive fluid motor means is indicated generally at 31, and comprises a longitudinal hollow cylinder 32 adapted to contain a piston (not shown) connected to a connecting rod 33, by means of a connecting rod outlet hole (not shown). The outer end of the connecting rod 33 is adapted to abut and make effective mechanical contact with a projecting member 34, which is mechanically fastened to a bracket 30' similar to the bracket 30 in the first form of the present invention, whereby left-ward actuation of the connecting rod 33 caused by left-ward actuation of the piston in the cylinder 32, caused by the introduction of a pressurized fluid (usually air) through the fitting 35, causes the slidable member 4' to be rearwardly biased in the same manner as the rearward biasing of the slidable member 4 in the first form of the present invention, caused by the biasing spring 28.

In other respects the modified form of the present invention illustrated in Fig. 6, is similar to the first form of the present invention illustrated in Figs. 1 through 5. Therefore, no further description of the modified form of the invention is thought necessary.

Numerous modifications and variations of the present invention will occur to those skilled in the art after a careful study hereof. All such properly within the spirit and scope of the present invention, are intended to be included and comprehended herein as fully as if specifically described, illustrated, and claimed herein.

For example, it should be understood that the structure of the base means and the slidable means can be modified substantially from that specifically described and illustrated herein. Any relatively movable arrangement for the two members can be employed. It should also be noted that the anti-friction means can be substantially modified or, under certain circumstances, dispensed with entirely.

It should also be noted that the follower means and the template engaging means can be substantially modified and, if desired, can be relatively positionally reversed.

The means for effectively biasing the follower means and/or the template engaging means against corresponding edges of the template can be modified substantially from that described and illustrated herein. It may comprise spring means of virtually any desired type, weight means, pressure means, or any other suitable means.

It should also be noted that the mounting of the template and the relative positioning of the reference edge and the guiding edge of the template can be substantially modified.

The fastening means for effectively fastening a cutting tool bit (which can be of any suitable type) can be adjustable or non-adjustable and can be modified substantially from that specifically described and illustrated herein.

The means for mounting the entire device can be modified substantially.

The exact compositions, configurations, relative positionings and cooperative relationships of the various component parts of the present invention are not critical and can be modified substantially within the spirit hereof.

The embodiments of the present invention specifically described and illustrated herein are exemplary only and are not intended to limit the scope of the present invention, which is to be interpreted in the light of the prior art and the appended claim only, with due consideration for the doctrine of equivalents.

I claim:

A profiling attachment for a machine tool having a movable tool post base means and provided with a variable width template having a reference edge and a guiding edge, said template being adapted to be effectively mounted in operative position with respect to the machine tool, comprising: a laterally recessed base member adapted to be mounted upon movable tool post base means of a machine tool; a tool bit carrying slide member slidably mounted in the laterally recessed base member; anti-friction means effectively positioned between the slide member and the base member to facilitate slidable movement of the slide member with respect to the base member; adjustable fastening means cooperable with the tool bit carrying slide member for adjustably and removably fastening a cutting tool bit in a selected forwardly projecting position with respect to the tool bit carrying slide member and with respect to the direction of slidable movement thereof; a rearwardly directed pivotally movable template supporting and engaging member carried by the base member and cooperable to slidably pivotally movably support the underside of a variable width template and to slidably movably engage the back reference edge of the variable width template; rearwardly directed follower means carried by the tool bit carrying slide member for slidably movable engagement with respect to the front guiding edge of the variable width template, whereby movement of the template engaging member and the follower means along the reference edge and the guiding edge, respectively, of the variable width template will cause slidable movement of the tool bit carrying slide member and the cutting tool bit carried thereby in a manner corresponding to the width of the template positioned between the template engaging member and the follower means; rearwardly directed hollow bore means in the rear of the base member; hollow tube means having one closed end and one open end mechanically carried by the slide member with the open end in movable slidable alignment with the hollow bore means in the base member; and compression biasing spring means extending from the closed end of the hollow tube means through the open end thereof into the hollow bore means into engagement with the base member whereby to effectively bias the follower means carried by the slide member into forced engagement with respect to the front guiding edge of the variable width template and whereby to effectively bias the template engaging member into forced engagement with respect to the rear reference edge of the variable width template.

References Cited in the file of this patent

UNITED STATES PATENTS

| | | |
|---|---|---|
| 43,311 | Jillson | June 28, 1864 |
| 1,031,726 | Mills et al. | July 9, 1912 |
| 1,049,263 | Pigg | Dec. 31, 1912 |
| 1,195,293 | Townsend | Aug. 22, 1916 |
| 1,206,528 | Goddu | Nov. 28, 1916 |
| 1,635,285 | Lovely | July 12, 1927 |